March 15, 1927.
H. E. VAN DORN
1,621,292
SWITCH AND VALVE CONTROL IN AIR AND ELECTRIC COUPLING SYSTEMS FOR CARS
Filed May 23, 1925      2 Sheets-Sheet 1
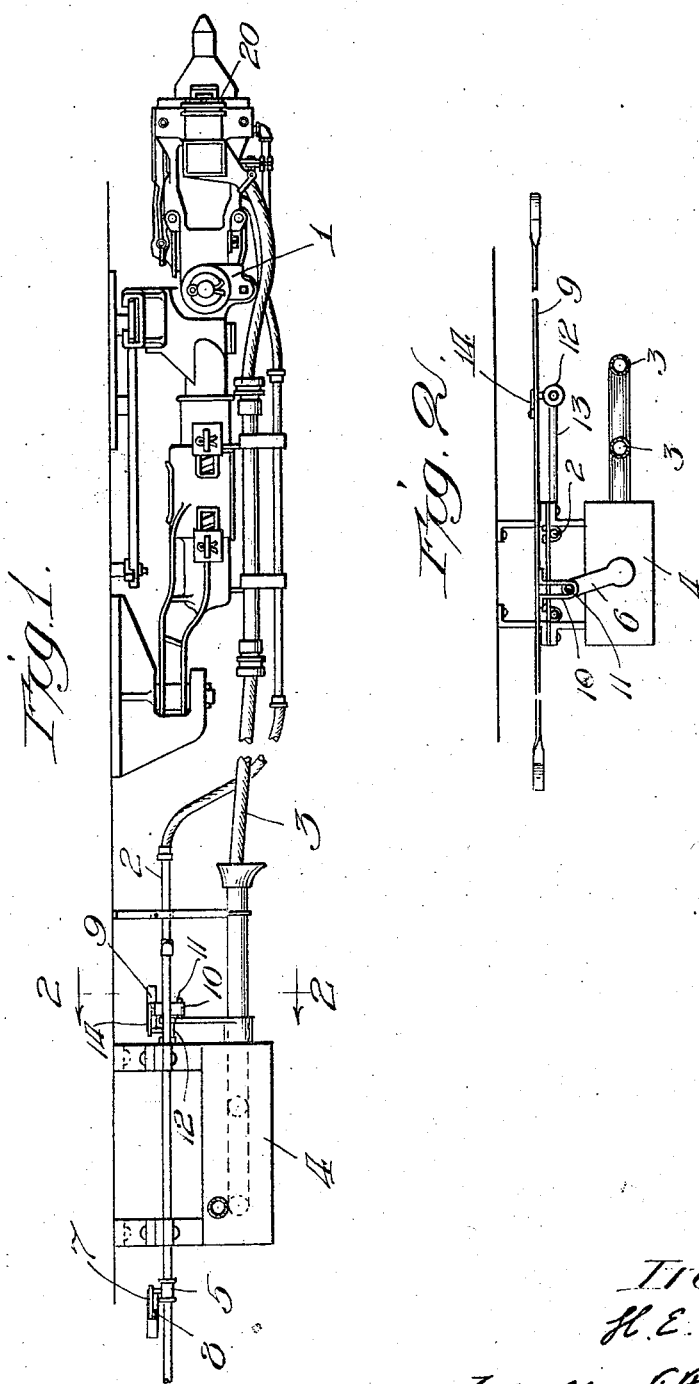
Inventor:
H. E. Van Dorn,
By Wm. F. Freudenreich,
Atty March 15, 1927. 1,621,292
H. E. VAN DORN
SWITCH AND VALVE CONTROL IN AIR AND ELECTRIC COUPLING SYSTEMS FOR CARS
Filed May 23, 1925 2 Sheets-Sheet 2
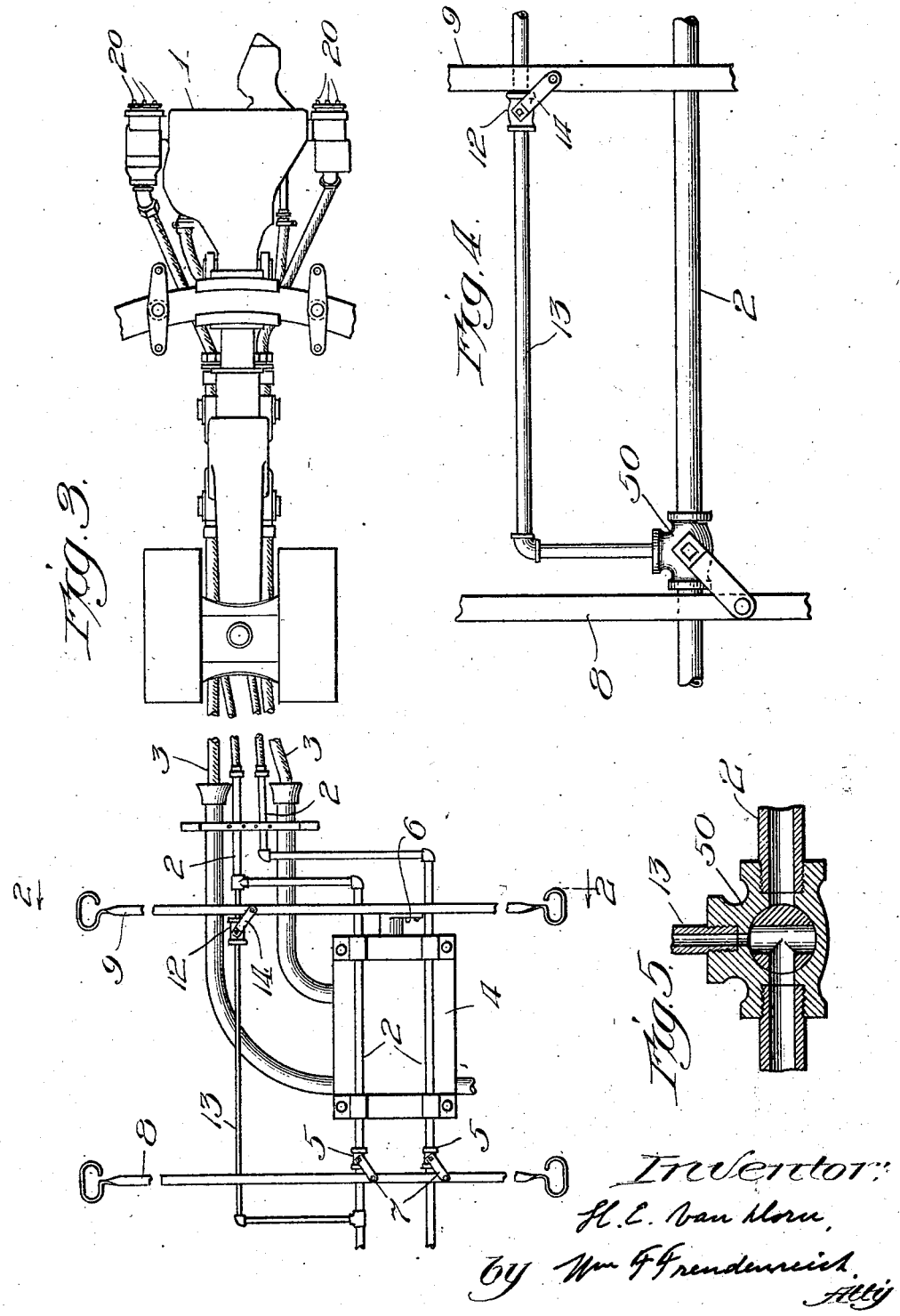

Patented Mar. 15, 1927.

1,621,292

UNITED STATES PATENT OFFICE.

HERBERT E. VAN DORN, OF CHICAGO, ILLINOIS.

SWITCH AND VALVE CONTROL IN AIR AND ELECTRIC COUPLING SYSTEMS FOR CARS.

Application filed May 23, 1925. Serial No. 32,310.

It is now common practice in railway work to have automatic couplers that serve not only mechanically to connect the cars together, but also to couple the air and the electric lines of the cars. Where the electric contacts at the coupler are exposed when a car is uncoupled, it is desirable that they are deenergized before an uncoupling connection is made. This, of course, has the other advantage of preventing arcing at the coupler contacts upon uncoupling, although this aspect of the matter is not of great importance. In order to uncouple cars provided with air brake systems, it is necessary first to close the air lines, since otherwise the brakes would be set when it was attempted to draw the cars apart. As a matter of ordinary practice, the trainmen or other workmen will naturally operate the switches that deenergize the coupler contacts, at the same time they close the air valves. However, there will inevitably be a small percentage of instances in which the workman will close the valves, but will not open the switches, due to abstraction, hurry or other causes.

In order to insure the opening of the switches before uncoupling two connected cars, the expedient of interlocking the switches and the valves in the train pipes, whereby the operation of the switches depends upon a more or less concurrent operation of the valves, has been adopted in some instances. However, this arrangement is open to the objection that the valves cannot be closed without opening the switches, nor can the switches be closed without operating the valves.

It sometimes happens that on account of electrical trouble, it is desirable to be able to open and close the switches without affecting the valves in the train pipes and therefore, where the valves and the switches are interlocked or connected together so as to be compelled to move more or less in unison with each other, the system is open to the objection that the air must always be shut off in order to open a switch in the event of electrical trouble in the system; so that the addition of the safety feature introduces an objectionable element that is not present in the old systems where the switches and the valves are independent of each other.

The object of the present invention is to produce a simple and novel construction and arrangement which will permit the air valves and switches to be operated independly of each other and at the same time insure a lessening of the danger that the switches will remain open when or after the cars are uncoupled.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side elevation of the coupling apparatus under one end of a car, embodying the present invention; Fig. 2 is a section taken approximately on line 2—2 of Fig. 1 and line 2—2 of Fig. 3; Fig. 3 is a top plan view of the mechanism shown in Fig. 1; Fig. 4 is a detail showing a slight modification and Fig. 5 is a horizontal section through the three-way valve shown in Fig. 4.

Referring to Figs. 1 to 3 of the drawings 1 represents an automatic car, air and electric coupler to which extend air lines 2, 2 and cables 3, 3 containing conductors; the coupler being adapted to co-operate with a complementary coupler simultaneously to connect together the cars, the air lines, and the conductors.

The conductors extend to and through a switch box 4 of any usual or suitable construction. In the train lines or pipes are valves, 5, 5. Projecting laterally from the switch box or casing is a switch-operating lever or arm 6.

The handles 7 of the valves in the train pipes may be connected to a single actuating rod 8 that may extend in opposite directions to the sides of the car, for example; thus permitting the valves to be opened and closed simultaneously from either side of the car. The switch-operating lever may be connected to a rod 9 similar to the rod 8, so that the switch may be closed or opened from either side of the car. The member 8 may move bodily transversely of the direction of its length as the handles 7, 7 swing through arcs of circles. I prefer, however, to provide a pin and slot connection between the operating rod 9 and the lever 6. Such an arrangement is best shown in Fig. 2 and consists of a U-shaped bracket 10 depending from the member 9 with its closed end directed downwardly. The lever has a pin 11, that is preferably made comparatively long, projecting laterally from the free end thereof through the bracket. Therefore as the lever swings, the pin may ride up and down in the bracket.

It will thus be seen that the air valves and the switch may be operated independently of each other so that the air may be shut off without affecting the electrical system, and the electrical system may be disconnected from the coupler without interfering with the air system.

In accordance with my invention I associate with the switch and with the air system an auxiliary valve which, even though the air valves be closed, will permit air to escape if the cars are separated without first opening the switch and thus deenergizing the coupler contacts. This valve is shown as arranged in a pipe connected to one of the train lines between the main shut off valve and the coupler and leading to some part of the air system from which air may flow while the main shut-off valves or cocks are closed. The air that escapes in the event that this auxiliary valve is left open when the cars are separated while the switch is open, may be caused to act in any one of a plurality of ways. Thus the air may bring about an emergency application of the brakes, or it may produce a service application of the brakes or, on the other hand, it may not bring about any immediate braking action, but only give a signal or alarm so as to apprise the workman that the switch remains open and the contacts 20 on the coupler energized.

In its specific arrangement illustrated, an auxiliary valve 12 is arranged in a small pipe 13 connected to one of the train pipes and forming a by-pass around the main valve in the latter. Since the pipe is small, the cars may be separated without producing any immediate braking action, but the escaping air at the coupler will produce a whistling sound that will attract the attention of the workman and indicate to him that he has neglected to open the switch. The handle 14 of the auxiliary valve is connected at its free end to the operating rod 9 for the switch; the parts being so arranged that when the switch is closed the valve is also closed whereas, when the switch is open the auxiliary valve is open.

In Figs. 4 and 5 I have shown a slight modification in which the auxiliary pipe 13 is connected at one end to the train line through a main cock or valve 50 that takes the form of a three-way valve.

While I have illustrated and described with particularity only a single preferred form of my invention, with a slight modification, I do not desire to be limited to the exact structural details thus illustrated and described; but intend to cover all forms and arrangements which come within the definitions of my invention constituting the appended claims.

I claim:

1. The combination with the electric and air brake systems of a car including an electric coupler, main shut-off valves, and a switch for connecting the electric system to the coupler, of means associated with said switch for causing air to escape from said air system when the car is uncoupled while said switch is open, regardless of the position of said valves.

2. The combination with the electric and air brake systems of a car including an electric coupler, main shut-off valves and a switch for connecting the electric system to the coupler, of a valve in said air system and connected to said switch, the parts being so constructed and arranged that the valve permits air to escape from the air brake system when the car is uncoupled while said switch is open, regardless of the position of said main shut-off valves.

3. The combination with the electric and air brake systems of a car, including electric and air coupling means and main shut-off valves, of a switch for controlling the connection of said electric system to said coupling means, and means associated with said switch for permitting air to escape from said air brake system upon the uncoupling of the car while said switch is closed.

4. The combination with the electric and air brake systems of a car, including air line coupling means and electric line coupling means having contacts exposed when the car is uncoupled, of main shut-off valves, a switch for connecting the electric system to said contacts to energize the latter, and disconnecting the same from the said contacts to deenergize the latter, and means associated with said switch for causing air from said air system to escape whenever the car is uncoupled while said contacts are energized.

5. The combination with the electric and air brake systems of a car, including electric and air coupling means and main shut-off valves, of a switch for connecting said electric system to said coupling means, a by-pass around one of said main valves, an auxiliary valve in said by-pass and a connection between said switch and said auxiliary valve.

6. The combination with the electric and air brake systems of a car including an electric coupler, main shut-off valves, and a switch for connecting the electric system to the coupler, of means associated with said switch for causing air to escape from said air system and the brakes to be applied.

In testimony whereof, I sign this specification.

HERBERT E. VAN DORN.